(12) United States Patent
Keefe (10) Patent No.: US 9,434,019 B2
(45) Date of Patent: Sep. 6, 2016

(54) RE-MANUFACTURE AND APPARATUS OF WORN RAILROAD FREIGHT CAR AND LOCOMOTIVE WHEELS BY ROTATIONAL CONTINUOUS LONGITUDINAL WELDING

(71) Applicant: CSX TRANSPORTATION, Jacksonville, FL (US)

(72) Inventor: Rodney L. Keefe, Jacksonville, FL (US)

(73) Assignee: CSX Transportation, Jacksonville, FL (US)

( * ) Notice: Subject to any disclaimer, the term of this patent is extended or adjusted under 35 U.S.C. 154(b) by 389 days.

(21) Appl. No.: 13/955,748

(22) Filed: Jul. 31, 2013

(65) Prior Publication Data
US 2014/0033535 A1    Feb. 6, 2014

Related U.S. Application Data

(63) Continuation of application No. 61/678,251, filed on Aug. 1, 2012.

(51) Int. Cl.
*B23K 9/32* (2006.01)
*B23K 9/00* (2006.01)
*B23K 9/04* (2006.01)
*B23K 28/02* (2014.01)
*B23P 6/00* (2006.01)

(52) U.S. Cl.
CPC ............. *B23K 9/325* (2013.01); *B23K 9/0026* (2013.01); *B23K 9/048* (2013.01); *B23K 28/02* (2013.01); *B23P 6/00* (2013.01); *Y10T 29/49483* (2015.01)

(58) Field of Classification Search
CPC .... B23K 9/325; B23K 9/048; B23K 9/0026; B23K 28/02; Y10T 29/49483
See application file for complete search history.

(56) References Cited

U.S. PATENT DOCUMENTS

8,177,115 B1    5/2012    Mercier

*Primary Examiner* — Moshe Wilensky
(74) *Attorney, Agent, or Firm* — McGuireWoods LLP (57) ABSTRACT

A method for re-manufacturing a worn railroad car wheel is described herein. The method includes identifying a candidate wheel or wheel set, preparing the wheel or wheel set to receive new welding, performing a welding operation on the wheel/wheel set, and performing post-welding steps to ensure the re-manufactured wheel meets a defined profile standard. Preparing the wheel may include cleaning, grinding, and pre-heating one or more surfaces of the wheel.

12 Claims, 10 Drawing Sheets

RE-MANUFACTURE AND APPARATUS OF WORN RAILROAD FREIGHT CAR AND LOCOMOTIVE WHEELS BY ROTATIONAL CONTINUOUS LONGITUDINAL WELDING

CROSS REFERENCE TO PRIOR APPLICATIONS

This application claims priority under 35 U.S.C. §119(e) to U.S. Provisional Patent Application No. 61/678,251, filed Aug. 1, 2012, titled "RE-MANUFACTURE AND APPARATUS OF WORN RAILROAD FREIGHT CAR AND LOCOMOTIVE WHEELS BY ROTATIONAL CONTINUOUS LONGITUDINAL WELDING," the disclosure of which is hereby expressly incorporated herein by reference in its entirety.

Applicant hereby incorporates herein the entirety of the disclosure of U.S. Pat. No. 8,367,960, entitled "Process and Apparatus for Rail Restoration and Rail Manufacture Using Welding, which issued from U.S. patent application Ser. No. 13/154,036, which claims priority to U.S. Provisional Patent Application No. 61/351,539, filed Jun. 4, 2010.

FIELD OF THE DISCLOSURE

This disclosure relates to a method, a system and an apparatus for restoring and/or remanufacturing the worn surface(s) of a metal wheel, such as, e.g., a wheel that may be used on a freight car, a locomotive, a railcar, or another vehicle that use metal wheels to travel on one or more rails.

BACKGROUND OF THE DISCLOSURE

Metal wheels, such as wheels used on freight cars, locomotives, other railcars, and the like, suffer abrasion and wear over time, due to rolling abrasive contact with rails of the railway tracks. Once an amount of wear on a metal wheel exceeds limits set by regulations, industry recommendations, company operations policies, and/or the like, it becomes necessary to replace the wheel. Replacement of such wheels is a significant operating expense for railroads and fleet owners.

SUMMARY OF THE DISCLOSURE

According to an aspect of the disclosure, a method is provided for restoring a worn metal wheel for a railcar or locomotive. The method comprises: identifying a worn wheel to be restored, including inspecting the worn wheel to determine service life remaining of the worn wheel; preparing the worn wheel to receive a welding material, including at least one of cleaning the worn wheel, lathing the worn wheel, grinding the worn wheel, and heating the worn wheel; engaging a welding unit and depositing the welding material onto the worn wheel; disengaging the welding unit upon determining that dimensions of the worn wheel have reached a predefined value; and performing a post-welding process to shape the worn wheel to a defined profile, including at least one of applying heat to the worn wheel, soaking the worn wheel in a quenching tank, lathing the worn wheel, and grinding the worn wheel to shape the worn wheel.

According to another aspect of the disclosure, a method is provided for restoring the worn surface of a metal wheel on a railcar or locomotive that includes identifying a worn wheel to be restored, preparing the worn wheel to receive a new welding, engaging a welding unit and depositing welding material onto the worn wheel, disengaging the welding unit upon determining that dimensions of the worn wheel have reached a predefined value, and performing a post-welding process to shape the worn wheel to a defined profile.

Identifying the worn wheel may include inspecting one or more wheels on the railcar or locomotive to determine a service life remaining for the respective wheel. The inspection may be a visual inspection or a computer-based automatic inspection.

Preparing the worn wheel to receive new welding may include cleaning the worn wheel to remove foreign matter from the surface of the wheel, performing one or more of a lathing or grinding operation on a surface of the worn wheel, and applying heat to the worn wheel to bring the wheel to a temperature conducive to receiving the new welding. The temperature may be, for example, between about 800 degrees Fahrenheit and about 1200 degrees Fahrenheit.

The post-welding process may include applying heat to the worn wheel, soaking the worn wheel in a quenching tank, and performing one or more of a lathing or grinding operation on a surface of the wheel to shape the wheel to a desired profile. Heat may be applied, for example, using an induction coil configured to heat a surface of the wheel.

Depositing welding material onto the worn wheel may include rotating the wheel at a controlled weld feed application speed and welding the new metal onto the wheel. The welding material may be performed using a gas metal welding (GMAW) process).

According to a further aspect of the disclosure, an apparatus is provided for restoring a worn wheel for a railcar or locomotive, where the apparatus comprises: a process fixture that receives and rotatably supports the worn wheel; a cleaning unit that removes foreign matter from the surface of a worn wheel; a grinding and milling unit that lathes and grinds the surface of the worn wheel; a pre-welding heating unit that applies heat to the surface of the worn wheel to bring the surface of the worn wheel to a temperature conducive to receiving a welding material; a welding unit that welds the welding material onto the surface of the worn wheel to provide a welded surface of the worn wheel; and a post welding heating unit that applies heat to the welded surface of the worn wheel. The temperature may be between about 800 degrees Fahrenheit and about 1200 degrees Fahrenheit.

The apparatus may further comprise a soaking unit that soaks the welded surface of the worn wheel, and/or a test unit that determines a quality of the worn wheel.

The welding unit may comprise a gas metal welder (GMAW).

At least one of the pre-welding heating unit and post welding heating unit may comprise an induction coil and an alternating current (AC) power source.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description that follows.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

The terms "including," "comprising," and variations thereof, as used in this disclosure, mean "including, but not limited to," unless expressly specified otherwise.

The terms "a," "an," and "the," as used in this disclosure, mean "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1:
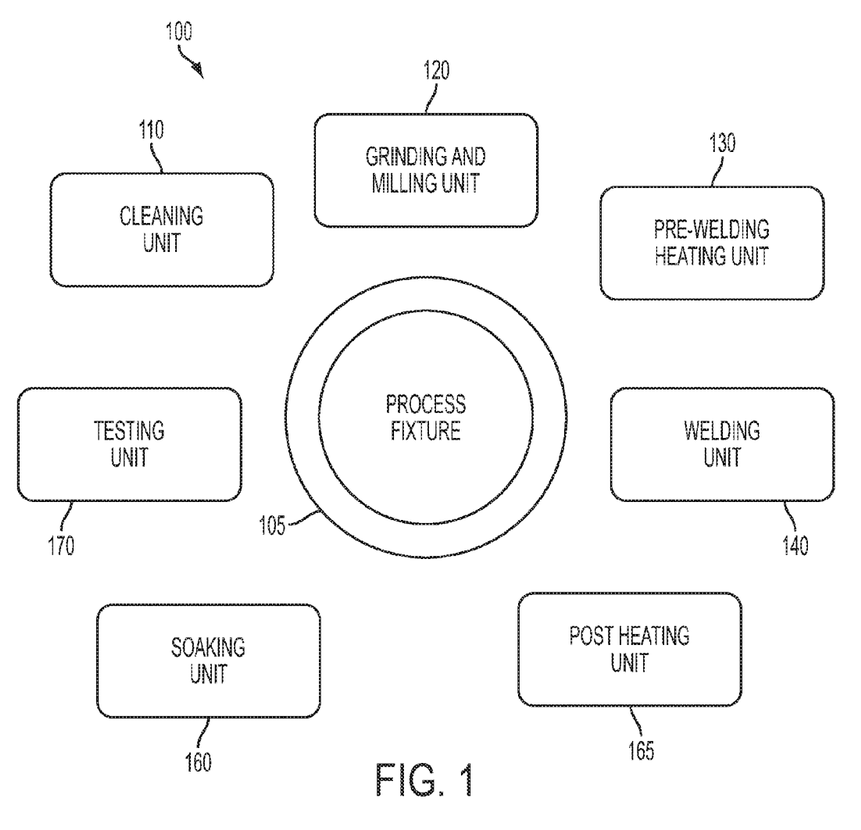
FIG. 1 shows an example of a system for remanufacturing a metal wheel according to the principles of the disclosure.

FIG. 1 shows an example of a system 100 for remanufacturing a worn wheel or wheel set, constructed according to the principles of the disclosure. The system 100 may include a process fixture apparatus 105, a cleaning unit apparatus 110, a grinding and milling unit apparatus 120, a heating unit apparatus 130, a welding unit apparatus 140, a soaking unit apparatus 160, a post-heating unit apparatus 165, and a testing unit apparatus 170. The system 100 may be located in, e.g., a remanufacturing facility, or the system 100 may be provided, e.g., on a vehicle for on-site remanufacturing. The various apparatuses of the system 100 may be co-located at a single geographic location, or the apparatuses may be located at a plurality of locations dispersed across two or more geographic locations.

The process fixture 105 may include, for example, a shaft, a lathe tool, a motor, a motor controller, and the like. The motor controller may be configured to drive the motor. The shaft may be configured to receive and support the wheel during the remanufacturing process. The lathe tool may be configured to, e.g., reprofile the wheel.

The cleaning unit 110 may be configured to clean the wheel thoroughly to effectively remove foreign matter (e.g., rust, contaminants, fluids, etc.) from the metal (e.g., steel). The cleaning unit 110 may include an applicator (not shown) to, e.g., apply a cleaning solution to the surface of the wheel.

The grinding and drilling unit 120 may be configured to remove any profile discontinuity or eliminate any crack and to form a clean and bright surface exposing stable and homogeneous metal of the wheel. The grinding and milling unit 120 may also perform the shaping of the wheel after the welding process is complete, which may include, e.g. restoration of the wheel tread to specifications as required for the particular wheel.

The heating units 130, 165 may include a power supply, a heating coil, and the like. The heating unit 130 may be configured to preheat the wheel to prepare the wheel to, e.g., about 800 to about 1000 degrees Fahrenheit. The heating unit 165 may be configured to heat the wheel post-welding, which may include application of high frequency post-welding heating. The heating units 130, 165 may be provided as one or more heating devices.

The welding unit 140 may include, e.g., a single welder, a multiple-ganged continuous spool wire feed longitudinal welders, or the like. The welding unit 140 may further include an inert gas enclosure for shield) and an inert gas applicator. The welding unit 140 may place multiple beads (or one or more continuous lines) of weld material onto the prepared and preheated surface of the wheel. The welding unit 140 may be in communication with the motor controller of the process fixture 105. Accordingly, during welding, the wheel may be rotated on the process fixture 105 at a controlled weld feed application speed by the motor controller in the process fixture 105.

The soaking unit 160 may include a quenching tank, or the like, into which the wheel may be submerged to achieve a specified hardness.

The testing unit 170 may include, e.g., an ultrasound generator and transducer to perform ultrasonic testing. It is noted that other known methods of testing are contemplated and may be employed without departing from the spirit or scope of the disclosure.

Figure 2:
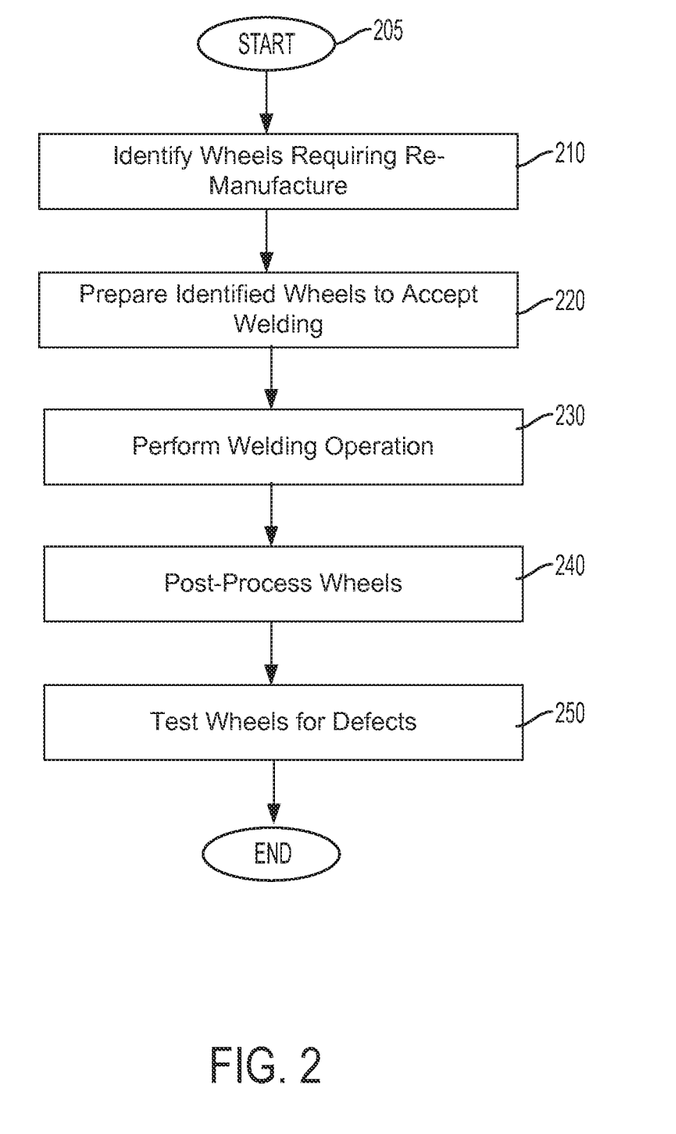
FIG. 2 shows an example of a process for remanufacturing a metal wheel according to the principles of the disclosure.

FIG. 2 shows an example of a process 200 for remanufacturing a worn wheel according to principles of the disclosure. Upon starting the process 200 (at 205), one or more wheels or wheel sets may be identified that require remanufacturing (at 210). The identification process may include determining whether a wheel or wheel set has a feasible amount of service life left. The wheels or wheel sets may be identified, for example, by inspecting and/or measuring various portions of the wheel, using any wheel measurement procedure, and comparing the measured values to predetermined requirements. The wheels may be inspected manually, for example, by visually inspecting and/or perform manual measurements of wheel parameters, or using a computer-based automatic inspection. Other inspection/measurement techniques may also be used.

As shown at 220, the one or more wheels/wheel sets that have been identified for remanufacturing may be prepared to accept welding during the remanufacturing process. Preparing the wheel may include, for example, cleaning the surface(s) of the wheel, lathing, grinding, and/or machine-milling the wheel(s) surface(s) to eliminate any cracks of profile discontinuity, resulting in a clean, bright surface that exposes stable and homogenous metal of the wheel. Preparing the wheel may also include heating the wheel surface to a temperature that ensures welding quality. In some aspects, during the preparation, a tracking identifier may be applied to the surface of the wheel to enable tracking of the wheel through the process 200. The tracking identifier may include, e.g., an alphanumeric character or series of characters, a symbol, an image, or the like. One or more sacrificial welds may be applied to the surface of the wheels to initiate the weld without damaging the parent metal.

As shown at 230, a welding operating may be performed on the wheels/wheel sets. The welding may continue until surface measurements of the wheel exceed a defined required value. In accordance with some principles of the disclosure, an additional amount over the required value may be used to determine when to disengage the welding unit. The welding may be performed via, e.g., pulsed gas metal arc welding (GMAW), resistance weld cladding (RWC), and/or the like. Other types of welding methods are also contemplated, such as, e.g., multiple-gang welding unit assemblies, multiple sequenced and controlled welding units, and/or the like, to control weld disposition and martensite development thereof. As known in the art, the GMAW process is a semi-automatic or automatic arc welding process, in which a continuous and consumable electrode wire and shielding gas are fed through a welding gun. There are several metal transfer methods in GMAW, such as, e.g., globular GMAW, short-circuiting GMAW, spray GMAW, and pulsed-spray GMAW (P-GMAW).

The new metal may be formed by welding or bonding a sufficient number of longitudinal continuous weld metal layers on the cleaned surface of the wheel to form a cross-section necessary for shaping a desired wheel profile. The number and shape of metal layers may vary depending on the current wheel profile and desired wheel profile. The metal layers may be adjacent and/or overlapped.

As shown at 240, the wheel(s) or wheel set(s) may undergo one or more post-processing operations. Post-processing may include, for example, heating the surface of the wheel to increase hardness and temper the surface of the wheel, soaking the wheel (or a portion thereof), to further stabilize the wheel, and shaping the wheel to a desired dimension and/or profile. As shown at 250, the wheel may be tested to detect any defects (such as, e.g., internal defects) and to ensure wheel quality.

Figure 3:
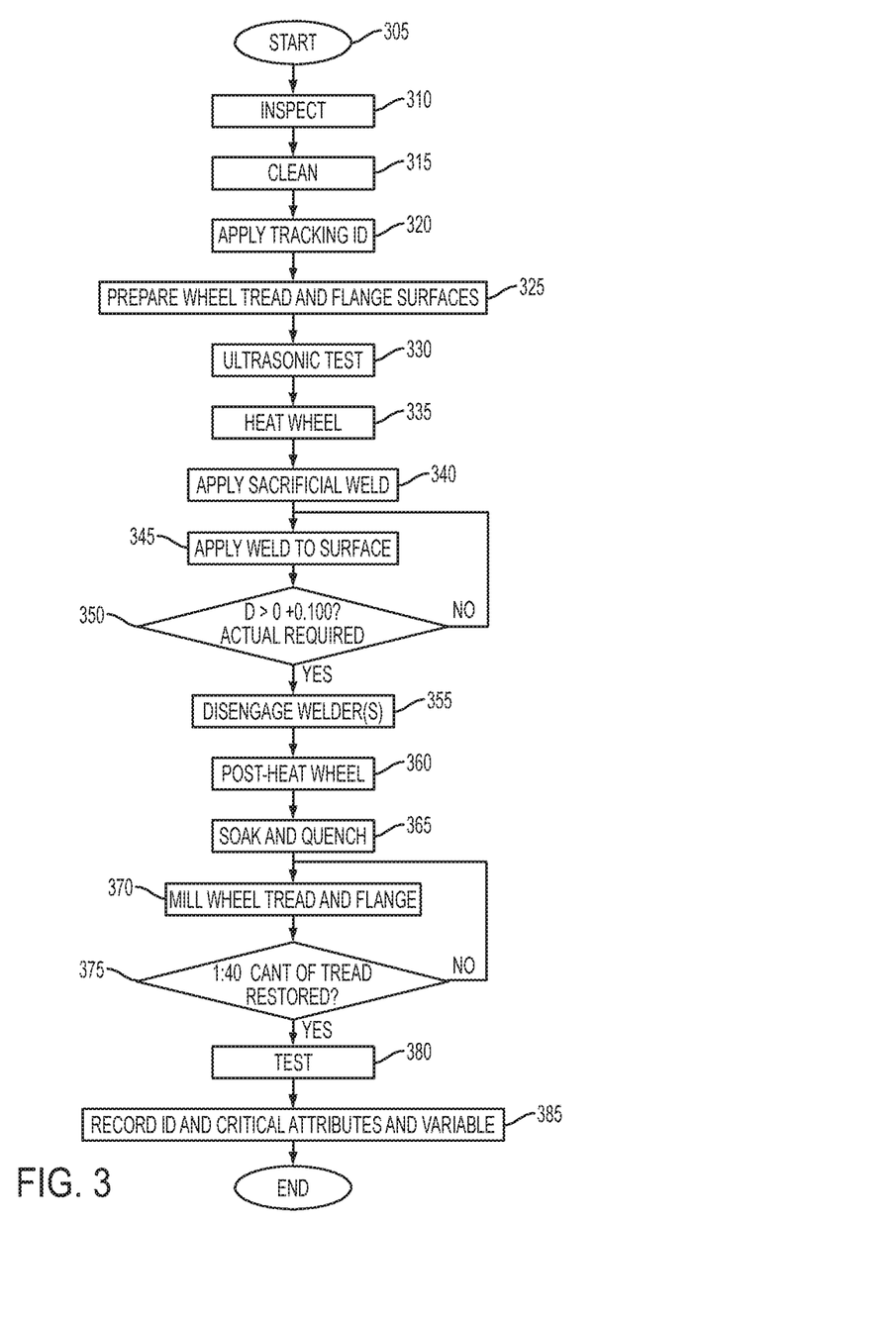
FIG. 3 shows an example of a process for remanufacturing a metal according to the principles of the disclosure.

FIG. 3 shows an example of a process 300 for remanufacturing a worn wheel according to the principles of the disclosure. Upon starting the process 300 (at 305), one or more wheels (or wheel sets) may be inspected (at 310) to identify which wheels or wheel sets require remanufacturing. The wheel (or wheel set) may be identified by, for example, measuring various portions of the wheel (as is known in the art) and comparing the measured values to predetermined requirements.

Since it may not be cost-effective to remanufacture worn wheels that have no or little service life left, the inspection at 310 may be focused on identifying a worn wheel that may have a feasible amount of service life left. The worn wheel or wheel set for restoration may be identified by various inspection methods, such as, e.g., visual inspection, computer-based automatic inspection, and/or the like, as known in the art.

Once a worn wheel (or wheel set) having a feasible amount of service life left is identified (at 310), it may be determined whether to un-mount the wheel from the axle to be remanufactured or whether to remove the wheel set (e.g., two wheels mounted on an axle). The wheel (or wheel set) may be cleaned thoroughly to effectively remove foreign matter from the steel (at 315). A process tracking identification (ID) may be applied to the wheel (at 320) to enable tracking of the wheel throughout the process 300.

The wheel (or wheel set) may be mounted on/in the process fixture apparatus 105. The worn surface(s) of the wheel or wheels, including the tread and/or the flange, may be prepared to accept welding (at 325) by, for example, cleaning the surface(s) of the wheel and lathing, grinding, machine-milling and/or the like, to eliminate any cracks or profile discontinuity and to form a clean and bright surface exposing stable and homogeneous metal of the wheel. The step of cleaning may include applying a cleaning solution to the wheel surfaces. Testing (at 330) may be done to identify wheel quality, such as, e.g., ultrasonic testing, and/or other methods of identifying wheel quality as is known in the art.

The surface of the wheel may then be heated (at 335) to a temperature, such as, e.g., between about 800° F. and about 1000° F. for a period of time to ensure suitable welding quality, for metallurgy and welding, using the heating unit 130 (shown in FIG. 1), which may include, e.g., an inductive coil or the like. One or more sacrificial initiation tabs may be applied to the surface(s) of the wheel (at 340) to initiate the weld without damaging the parent metal.

After pre-heating the wheel (at 335), the wheel may be rotated at a controlled application speed by (or in) the process fixture 105 and new metal may be welded on the clean surface of the wheel (at 345). The welding may be performed until a determination (at 350) is made that the actual dimension(s) $D_{ACTUAL}$ of the wheel exceed the required dimension(s) $D_{REQUIRED}$ by, for example, 0.100 inches (NO at 350). If a determination is made that $D_{ACTUAL}>D_{REQUIRED}+0.100$ inches (YES at 350), then the welding unit 140 may be disengaged (at 355). The disclosed excess dimension may be set to values other than 0.100 inches, including values that are greater for smaller) than 0.100 inches.

In order to increase the hardness and temper the surface of the wheel, a post-heating step may be carried out (at 360) using the heating unit 130, which may include, e.g., induction heating equipment having an induction coil, or the like. The heating unit 130 may further include a power supply, a transformer, a water cooler, and the like. The power supply may be an AC solid-state air-cooled power supply operating at, e.g., about 35 kW (about 5 to about 50 KHz) and, e.g., about 480 V (3 phase, about 60 Hz input). The transformer may be a water-cooled and load-matching and rated at, e.g., about 350 kVA. The water cooler may be an air-to-water fan-cooled dual heat exchanger rated to, e.g., about 55,000 BTU. The induction heating coil may be water-cooled and the head of the coils may be coated with alumina ceramic to prevent arcing.

The post-heating (at 360) may be carried out at, e.g., about 1100° F., for a period of time to ensure suitable welding quality. However, the post-heating temperature may vary depending on the weld dimension and/or the like. The post-heating (at 360) may be performed substantially immediately after the welding (at 345).

The wheel may then be placed in the soaking unit 160, which may include a quenching tank that is configured to receive a part of, or the entire wheel (at 365). The soaking (at 365) may be performed substantially immediately after the post-heating (at 360), and may include soaking and quenching the wheel in, e.g., the quenching tank to further stabilize surface hardness.

The wheel may be shaped (at 370) by, e.g., grinding, milling and/or the like, the wheel to a desired dimension and/or profile. The shaping process may continue (NO at 375) until, e.g., the tread surface is restored to a cant of, e.g., about 1:40 (at 375). If a determination is made that the desired cant has be attained (YES at 375), then the remanufactured wheel may be tested (at 380) using the testing unit 170, which may employ one or more non-destructive testing methods, such as, e.g., ultrasonic testing or the like, to detect internal defects and ensure the wheel quality. The identification of the wheel and critical attributes and variables may be recorded (at 385). The wheel may be reintroduced into viable inventory stock and/or remounted on an axel and applied to a locomotive or rail car.

FIGS. 4-10 show various stages of the process 200 and/or the process 300, according to the principles of the disclosure.

Figure 4A:
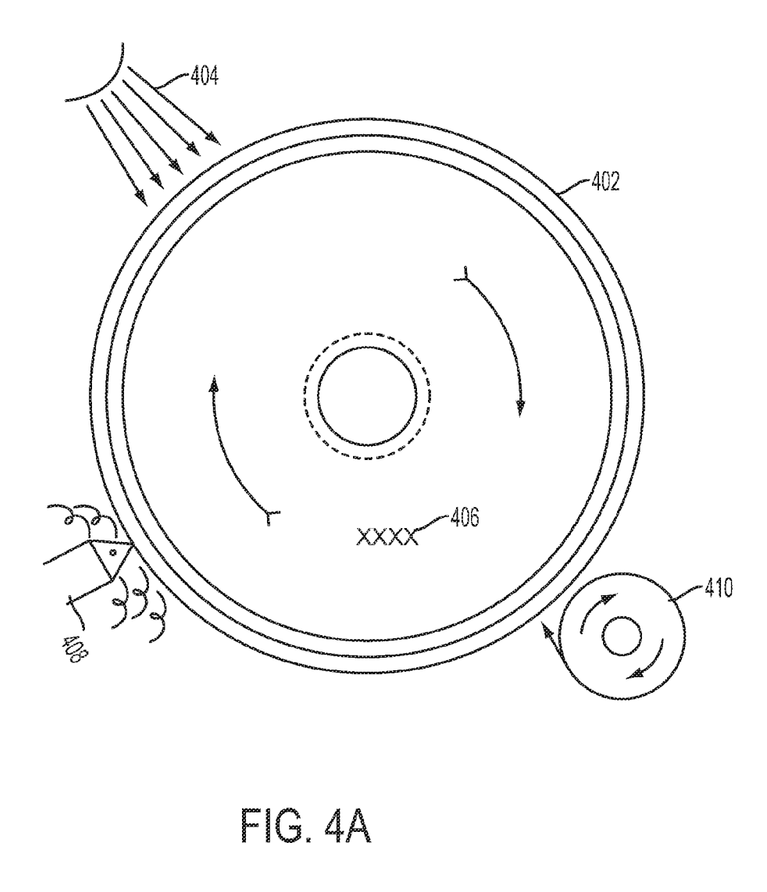
FIGS. 4A and 4B show a side view and a cross-sectional view, respectively, of an example of an apparatus for preparing a wheel to accept welding by cleaning the wheel with a lathe and/or grinder wheel.
Figure 4B:
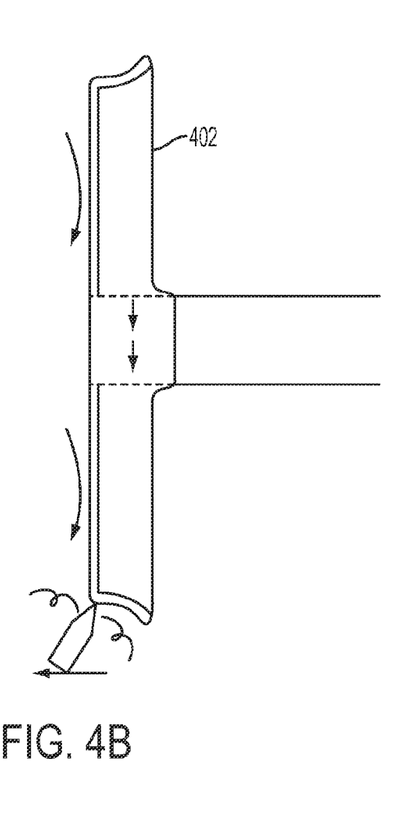

FIGS. 4A and 4B show a side view and a cross-sectional view, respectively, of an apparatus for preparing the wheel to accept welding, which may be implemented in, for example, step 210 shown in FIG. 2 and/or steps 315, 320, and 325 of FIG. 3. As seen in FIG. 4A, a cleaning unit (cleaning unit 110, shown in FIG. 1) may apply a cleaning solution 404 to a wheel 402 to clean the surfaces of the wheel 402. An identification marker (not shown) may mark the wheel 402 with an identification mark 406. The identification mark may record the mark on/in a surface of the wheel 402 by, e.g., etching the mark into the wheel surface (e.g., using a laser, a drill-bit, or the like), welding the mark onto the surface, writing the mark (e.g., using a marker, or the like) on the surface, affixing a plate with the mark to the surface (e.g., a label, a label plate, or the like), or the like. A grinding and milling unit (e.g., grinding and milling unit 120, shown in FIG. 1) may include a lathe tool 408 and/or a grinding tool 410 that may mill and grind the surface(s) of the wheel to re-profile the wheel 402.

As seen in FIG. 4B, the wheel 402 may be mounted to an axle and rotated by a motor (not shown) during the preparation of the wheel 402. The wheel 402 may be rotated at a speed to optimize the preparation processes, including cleaning, grinding, and milling of the surface(s) of the wheel 402.

Figure 5A:
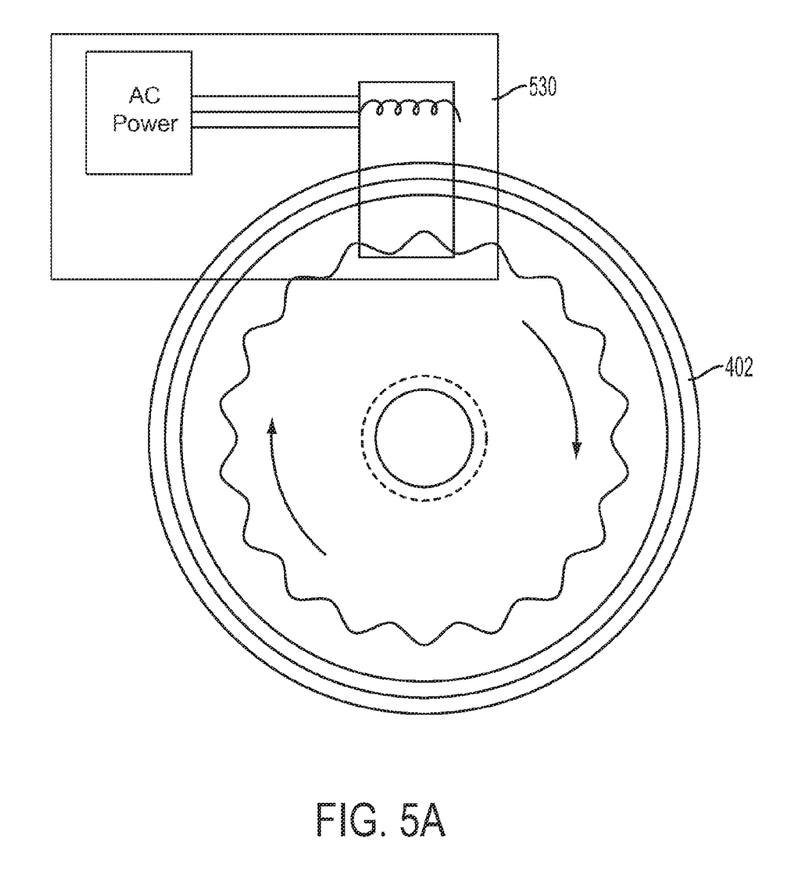
FIGS. 5A and 5B show a side view and a cross-sectional view, respectively, of an example of an apparatus for preheating a wheel tread surface.
Figure 5B:
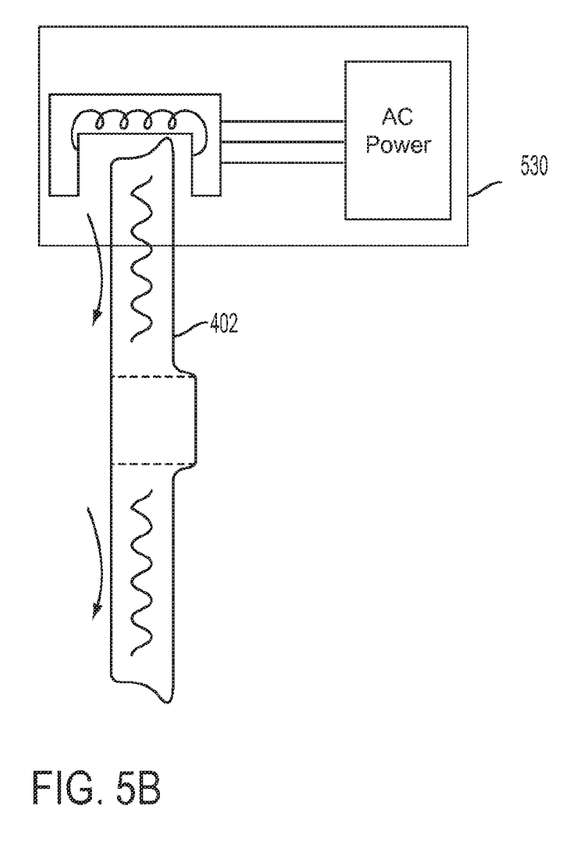

FIGS. 5A and 5B show a side view and a cross-sectional view, respectively, of an example of an apparatus for pre-heating the wheel tread surface. As seen in FIG. 5A, heat may be applied to the surface of the wheel 410 via a heating unit 530. The heating unit 530 may be the same as the pre-welding heating unit 130, shown in FIG. 1. The heating unit 530 may include, for example, an induction coil powered by an AC power source.

FIG. 5B shows a cross-sectional view of the heating unit 530 and wheel 402, which may be mounted to a rotatable axle (not shown) and rotated by a motor (not shown). As seen in FIG. 5B, the induction coil may be configured to substantially envelope an area of the wheel 402 that is to be remanufactured.

Figures 6A, 6B:
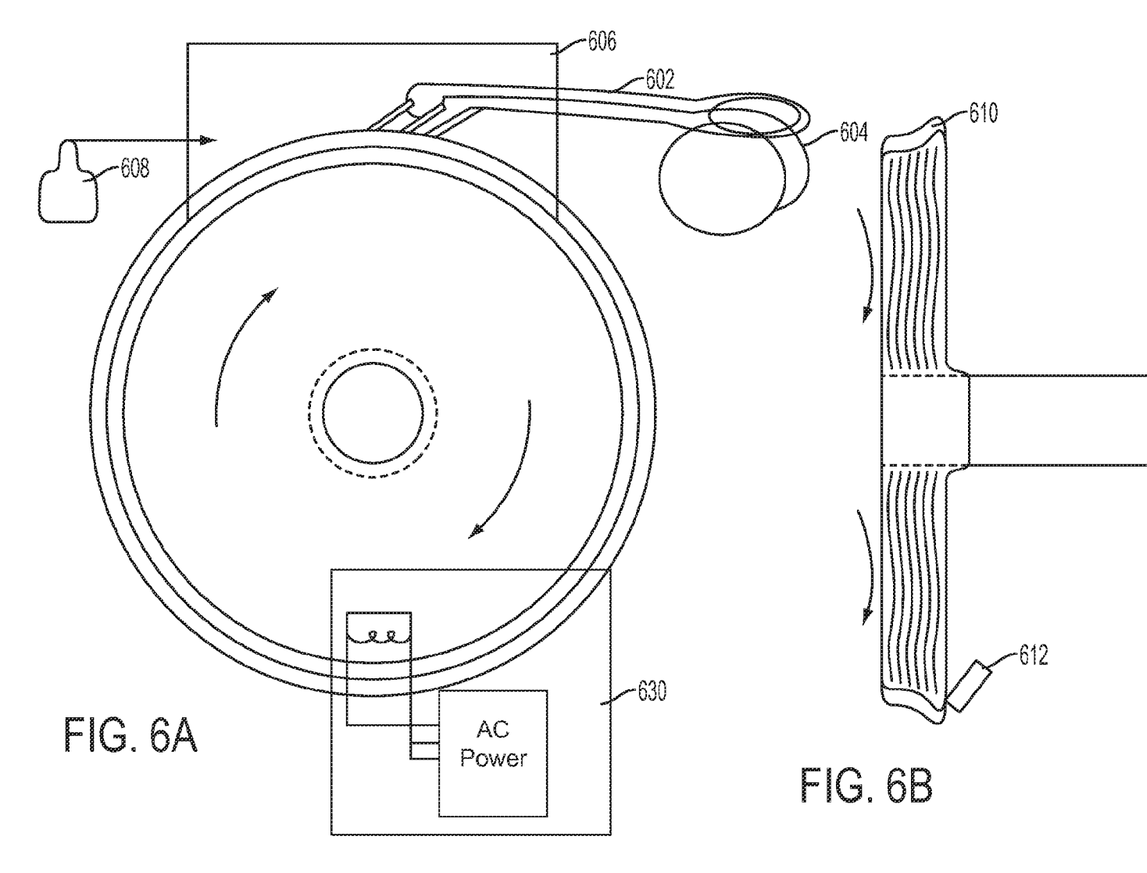
FIGS. 6A and 6B show side view and a cross-sectional view, respectively, of an example of an apparatus for maintaining the surface temperature of the wheel to accept the weld metal while welding the weld metal to the wheel and injecting an inert gas.

FIGS. 6A and 6B show a side view and a cross-sectional view, respectively, of an example of an apparatus for maintaining the surface temperature of the wheel to accept the weld metal while welding the weld metal to the wheel and injecting an inert gas. As seen in FIG. 6A, the apparatus may include a welding unit and a heating unit 630. The welding unit may include a multi-gang welder 602 that may be used to apply wire welding material 604 to a surface of the wheel 402. The welding unit may be substantially the same as the welding unit 140 (shown in FIG. 1). In accordance with principles of the disclosure, the welding unit may include a gas metal arc welding process. As such, the welding unit may include an inert gas enclosure 606 that may be provided to receive an inert gas 608 such as, for example, Argon, while welding the weld metal to the wheel 402. The inert gas may be applied under pressure using, e.g., a welding gun. As seen in FIG. 6B, the welding unit may apply a weld material 610 to a thickness of, for example, about 0.100 inches above the specified required thickness in order to create a sacrificial surface. As noted earlier, the weld material 610 may be applied with a thickness greater (or less) than 0.100 inches above the specified required thickness. A weld tab 612 may be applied to initiate the weld without damaging the parent metal. The heating unit 630 may continue to apply heat to the wheel surface during the welding process to maintain the surface temperature of the wheel surface to a temperature suitable for accepting the weld material. The heating unit 630 may be the same as the pre-welding heating unit 130 (shown in FIG. 1).

Figure 7:
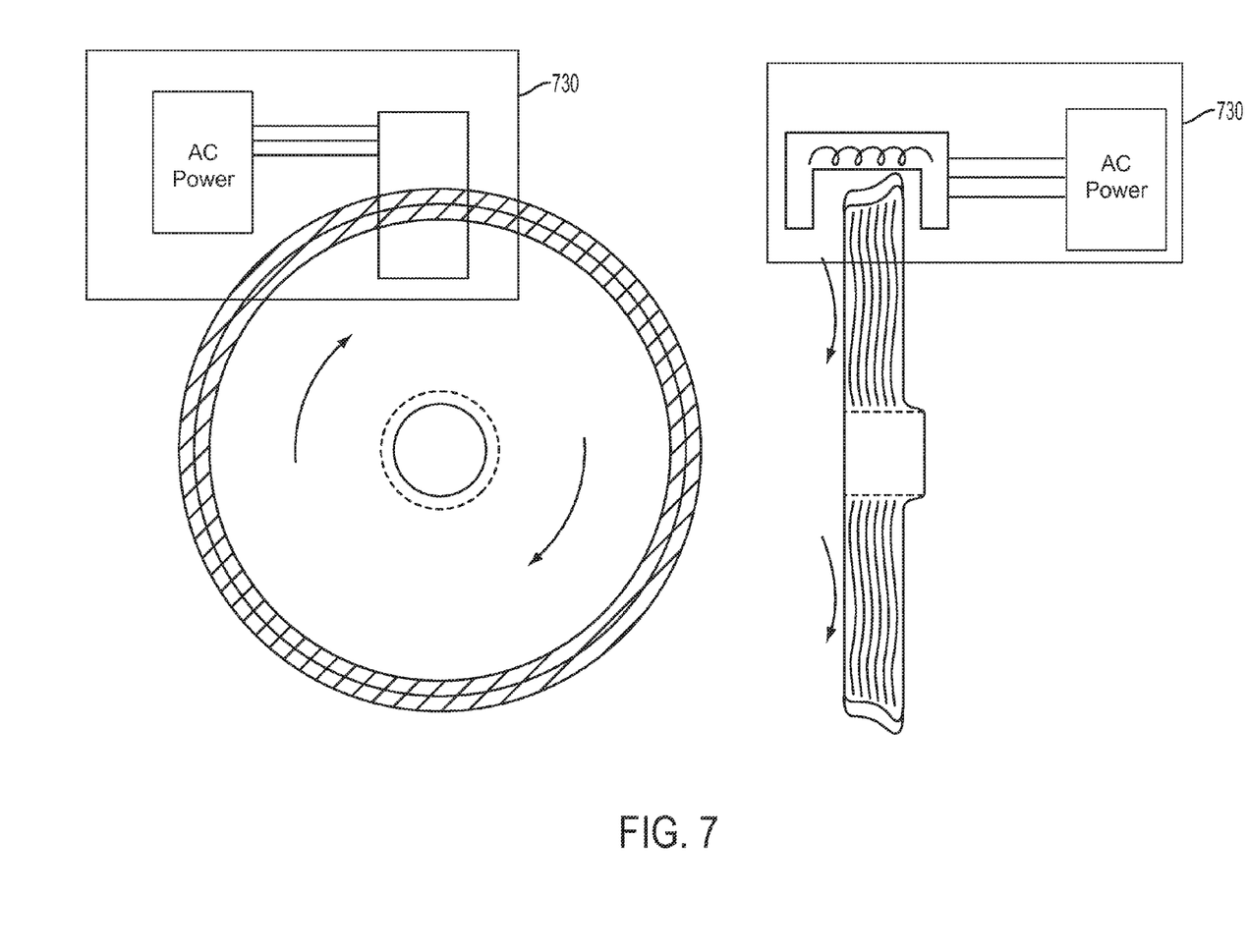
FIG. 7 shows a side view and a cross-sectional view of an example of an apparatus for post-heating the wheel, after a welding material has been applied to a wheel.

FIG. 7 shows a side view and a cross-sectional view of an apparatus for post-heating the wheel 402, after the welding material has been applied to the wheel 402. As seen in FIG. 7, post heat may be applied to the surface of the wheel 410 via a post heating unit 730. The post heating unit 730 may be the same as the post heating unit 165 (shown in FIG. 1) and/or pre-welding heating units 530, 630 (shown in FIGS. 5A, 5B and 6). Where the system 100 (shown in FIG. 1) is located at a single geographic location, a single heating unit may be used for the pre-welding heating units 130, 530 and/or 630, and the post heating units 165 and/or 730. As seen in FIG. 7, the welded material 610 has been applied to the wheel worn surface and the heating unit 730 may apply heat to the wheel 402 to temper the wheel surface.

Figure 8:
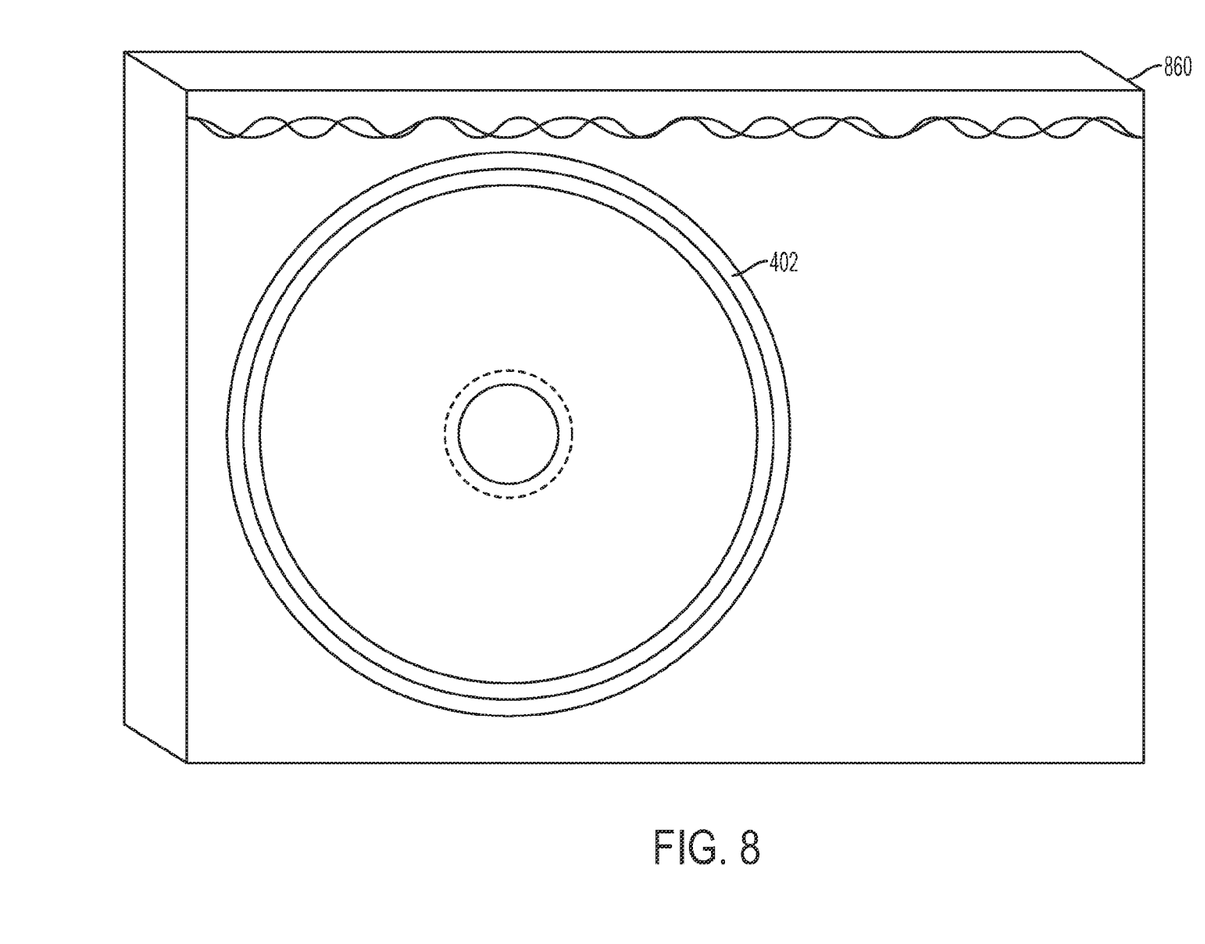
FIG. 8 shows an example of an apparatus for soaking and quenching a wheel in a soaking unit.

FIG. 8 shows an example of an apparatus 860 for soaking and quenching the wheel. The apparatus 860 may be the same as the soaking unit 160, shown in FIG. 1. As seen in FIG. 8, the wheel 402 may be fully submerged into the apparatus 860, which may include, for example, a quenching tank. While the wheel 402 is shown as fully submerged in this example, in accordance with principles of the disclosure, the wheel 402 may be partially submerged.

Figure 9:
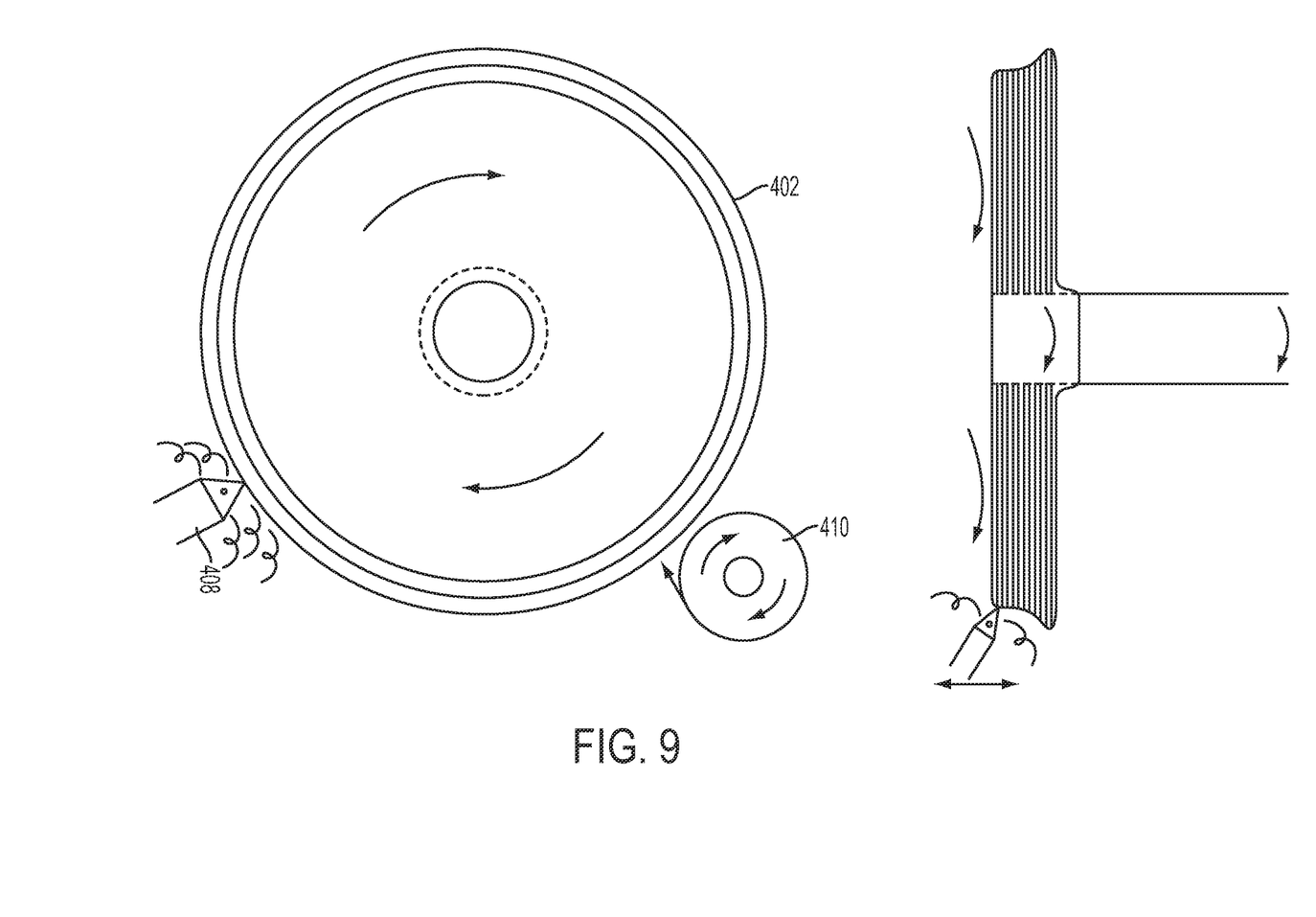
FIG. 9 shows an example of an apparatus for profiling the wheel to specification.

FIG. 9 shows a side view and a cross-sectional view of an apparatus for profiling the wheel 402 to specification. As seen, the apparatus may include a grinding and milling unit, which may include the lathe tool 408 and/or the grinding tool 410 to mill and grind the surface(s) of the wheel 402. The grinding and milling unit may be the same as the grinding and milling unit 120, shown in FIG. 1. As seen in FIG. 9, the lathe tool 408 and/or a grinding tool 410 may be used to further profile the wheel 402 to the desired specifications. For example, the wheel 402 may be profiled until the tread surface is restored to a cant of e.g., about 1:40.

Figure 10:
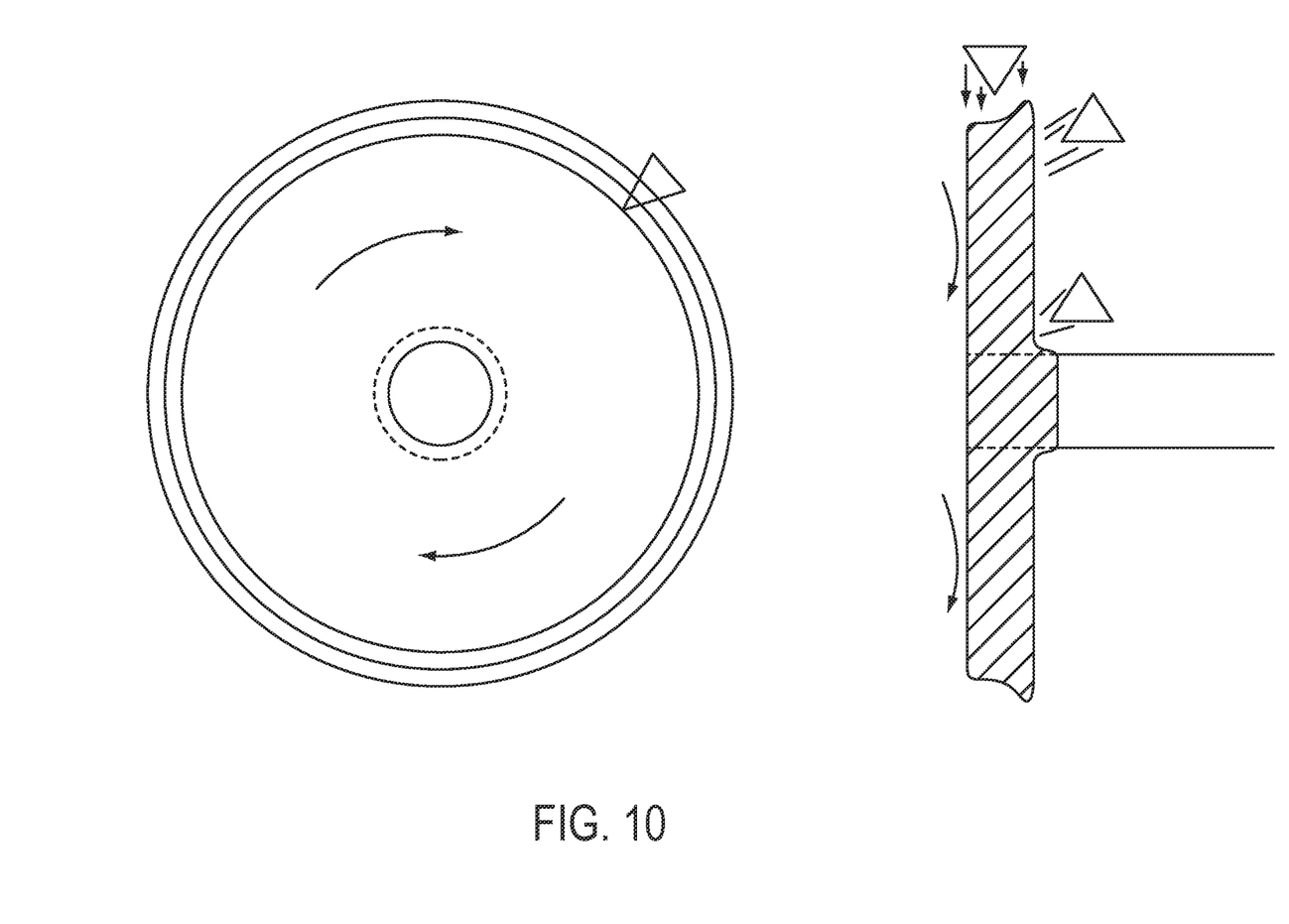
FIG. 10 shows an example of an apparatus for non-destructively testing the wheel.

FIG. 10 shows a side view and a cross-sectional view of an example of an apparatus for non-destructively testing the wheel, e.g., via ultra-sonic, eddy current, or another acceptable testing methodology, to ensure dimensions, hardness, and weld quality. For example, as seen in FIG. 10, the hardness of the tread/flange may be measured at one or more points on the wheel using one or more transducers. In this example, a first transducer may be positioned proximate the tread area to measure the tread area of the wheel 402; a second transducer may be positioned proximate the flange area to measure the flange area of the wheel; and a third transducer may be positioned proximate the axle mounting area to measure the axle mounting area of the wheel 402. The transducers may be configured to, e.g., emit and receive ultrasonic waves. The transducers may be coupled to a computer (not shown), as is known in the art, to measure dimensions, hardness and weld quality of the wheel 402.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications, or modifications of the disclosure.

What is claimed:

1. A method for restoring a worn metal wheel for a railcar or locomotive, comprising:
   identifying a worn wheel to be restored, including inspecting the worn wheel to determine service life remaining of the worn wheel;
   preparing the worn wheel to receive a welding material, including at least one of cleaning the worn wheel, lathing the worn wheel, grinding the worn wheel, and heating the worn wheel;
   engaging a welding unit and depositing the welding material onto the worn wheel;
   disengaging the welding unit upon determining that dimensions of the worn wheel have reached a pre-defined value; and
   performing a post-welding process to shape the worn wheel to a defined profile, wherein the post-welding process comprises:
      applying heat to the worn wheel;
      quenching the worn wheel; and
      performing one or more of lathing the worn wheel and grinding the worn wheel to shape the worn wheel.

2. A method for restoring a worn metal wheel for a railcar or locomotive, comprising:
   identifying a worn wheel to be restored;
   preparing the worn wheel to receive a welding material;
   engaging a welding unit and depositing the welding material onto the worn wheel;
   disengaging the welding unit upon determining that dimensions of the worn wheel have reached a pre-defined value; and
   performing a post-welding process to shape the worn wheel to a defined profile, wherein the post-welding process comprises:
      applying heat to the worn wheel;
      quenching the worn wheel; and
      performing one or more of a lathing and a grinding operation on a surface of the worn wheel to shape the worn wheel to a desired profile.

3. The method of claim 2, wherein identifying a worn wheel comprises inspecting a worn wheel to determine a service life remaining for the wheel.

4. The method of claim 3, wherein the inspection comprises one of a visual inspection and a computer-based automatic inspection.

5. The method of claim 2, wherein preparing the worn wheel to receive a new welding comprises:
   cleaning the worn wheel to remove foreign matter from a surface of the wheel;
   performing one or more of a lathing and a grinding operation on a surface of the worn wheel to remove cracks; and
   applying heat to the worn wheel to bring the worn wheel to a temperature conducive to receiving the welding material.

6. The method of claim 5, wherein the temperature is between about 800 degrees Fahrenheit and about 1200 degrees Fahrenheit.

7. The method of claim 2, wherein depositing the welding material onto the worn wheel comprises:
   rotating the worn wheel at a controlled weld feed application speed; and
   welding the welding material on the worn wheel.

8. The method of claim 2, further comprising:
   applying a process tracking identifier to a surface of the worn wheel; and
   recording the process tracking identifier along with attributes and variables associated with the worn wheel.

9. The method of claim 2, further comprising:
   performing a test to determine wheel quality after performing the post-welding process.

10. The method of claim 2, wherein depositing the welding material is performed by a gas metal welding (GMAW) process.

11. The method of claim 5, wherein the heat is applied using an induction coil configured to heat a surface of the wheel.

12. The method of claim 2, further comprising:
   mounting the worn wheel to a process fixture.

* * * * *